UNITED STATES PATENT OFFICE.

McKENZIE ARNN, OF GLADE SPRING, VIRGINIA, ASSIGNOR TO M. B. McKINNEY, OF GLADE SPRING, VIRGINIA.

ARTIFICIAL GRANITE.

SPECIFICATION forming part of Letters Patent No. 691,711, dated January 21, 1902.

Application filed April 19, 1901. Serial No. 56,647. (No specimens.)

*To all whom it may concern:*

Be it known that I, McKENZIE ARNN, a citizen of the United States, residing at Glade Spring, in the county of Washington and State of Virginia, have invented certain new and useful Improvements in Artificial Granite; and I do hereby declare the following to be a full, clear, and exact description of the invention, such as will enable others skilled in the art to which it appertains to make and use the same.

My invention relates to a new and useful compound, which will be presented in detail in the following specification and comprehended in the claim thereunto appended.

My object is to provide or combine a certain grouping of common well-known elements in such a manner and in such proportions that the resultant product will be an artificial granite possessing all of the beauty and durability characteristic of natural granite of the best quality and in addition may be freely manipulated or molded or otherwise shaped, so as to form many very useful articles, as bricks, paving-stones, window-sills, insulators, and almost an endless variety of other desirable articles, *ad infinitum*.

My invention comprehends not only the combination of ingredients necessary in the production of an artificial material useful for building purposes and other requirements of man, but also involves a line of procedure or a method of mixing or combining the ingredients necessary to produce an artificial building-stone of the character specified, as will be hereinafter particularly pointed out.

The basic element comprehended in my invention is what is commonly termed "slag," a by-product incident to the reduction of iron ore, the term "slag" being commonly employed to designate the debris or residuum left by the molten iron as the latter passes from the furnace to the mold.

I first free the molten slag from lighter foreign matter incorporated therewith, as ash, coke, &c., which I accomplish, as far as possible, by receiving the molten mass into a suitable settling-reservoir, from which I draw the slag through an aperture in the lower end of said receptacle, thus leaving the lighter portion thereof remaining in the tank, which latter may be cleaned from time to time, as will be obvious. I therefore prefer to use only the denser or heavier portion of the molten slag as the basic element in manufacturing my artificial granite, the added ingredients being substantially as follows—that is to say, in order to intelligently present a formula for the guidance of the manufacturer I will illustrate by a definite detailed statement the exact proportions of the other ingredients employed in combination with said basic element or pure slag, and I will do so upon the assumption that one hundred tons of the finished artificial granite of the highest grade is to be produced—to wit: five pounds borax, twenty-five pounds pulverized charcoal, ten pounds black lead, (plumbago,) one hundred pounds salt, (chlorid of sodium,) two hundred pounds cleaned or washed sand, (silex or silica,) five pounds rosin, and one hundred pounds pulverized baryta.

The foregoing ingredients are thoroughly incorporated with each other, and the resultant concrete powder is combined with a sufficient quantity of the basic element or slag, above referred to, to produce a total of substantially one hundred tons, more or less. The concrete powder, formed substantially as above set forth, may be thoroughly incorporated with the basic element in any preferred way, as by delivering at intervals during the flow of the slag into the receptacle the given quantity of the powdered mixture, any of the well-known means being employed for this purpose. The incorporated mass, including the basic elements, slag being thus held in a suitable reservoir in a liquid state, may be drawn off into suitable molds and the resultant product given any desired form, as common ordinary building-bricks, paving-stones, window-sills, and hundreds of other articles in common every-day use.

While I have described the proportions and the principal elements involved in producing my artificial granite, it will be understood that I desire to comprehend all possible substitutes and equivalents, inasmuch as it may be found in practice that the specified formula may be materially departed from without taking from the product the desired characteristics.

It is found by actual experiment and test that when the material produced in the manner substantially as above specified is turned into a mold the silex and salt will be so acted upon by the mold, which is relatively cold, that the object formed by the mold will possess a perfect impervious glazed surface, thereby rendering the article produced germ-proof and a non-conductor of electricity, moisture, &c. It is further found that the surface thus imparted to the object is susceptible of being given a very high polish, an important and valuable desideratum.

Having thus fully described the nature and some of the many uses to which my invention may be applied, further description and reference to the details thereof is deemed unnecessary in this application.

What I claim as new, and desire to secure by Letters Patent, is—

An artificial granite formed by mixing, as stated, the following ingredients, to wit: five pounds borax, twenty-five pounds pulverized charcoal, ten pounds black lead (plumbago), one hundred pounds salt (chlorid sodium), two hundred pounds cleaned or washed sand (silex or silica), five pounds rosin, one hundred pounds of pulverized baryta and one hundred and ninety-nine thousand one hundred and fifty-five pounds more or less, of slag incorporated with the above-specified quantities of said ingredients to form a total of one hundred tons, of the composition, a little more or a little less.

In testimony whereof I affix my signature in presence of two witnesses.

McKENZIE ARNN.

Witnesses:
W. T. FITZ GERALD,
PHILIP F. LARNER.